United States Patent
Haentjens et al.

(10) Patent No.: US 11,880,503 B1
(45) Date of Patent: Jan. 23, 2024

(54) SYSTEM AND METHOD FOR POSE PREDICTION IN HEAD WORN DISPLAY (HWD) HEADTRACKERS

(71) Applicant: Rockwell Collins, Inc., Cedar Rapids, IA (US)

(72) Inventors: Gavin P. Haentjens, Arlington, VA (US); Christopher M. Boggs, Gainesville, VA (US); Troy D. Driscoll, West Linn, OR (US); William T. Kirchner, Ashburn, VA (US); Brandon E. Wilson, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 18/084,337

(22) Filed: Dec. 19, 2022

(51) Int. Cl.
| | |
|---|---|
| *G06F 3/01* | (2006.01) |
| *G06F 3/0346* | (2013.01) |
| *G06T 7/20* | (2017.01) |
| *A42B 3/30* | (2006.01) |

(52) U.S. Cl.
CPC ............ *G06F 3/012* (2013.01); *A42B 3/30* (2013.01); *G06F 3/0346* (2013.01); *G06T 7/20* (2013.01); *G06T 2207/30244* (2013.01)

(58) Field of Classification Search
CPC ......... G06F 3/012; G06F 3/0346; A42B 3/30; G06T 7/20; G06T 2207/30244
See application file for complete search history.

(56) References Cited

U.S. PATENT DOCUMENTS

| | | |
|---|---|---|
| 10,216,265 B1 | 2/2019 | Kirchner et al. |
| 10,469,820 B2 | 11/2019 | Jiang et al. |
| 10,474,915 B2 | 11/2019 | Schwarz et al. |
| 10,754,419 B2 | 8/2020 | Chung et al. |
| 10,761,326 B2 * | 9/2020 | Aymeric ............ G02B 27/0093 |
| 10,909,715 B1 | 2/2021 | Boggs et al. |
| 11,209,655 B2 | 12/2021 | Amati et al. |
| 11,301,677 B2 | 4/2022 | Molin et al. |
| 11,354,812 B2 | 6/2022 | Menozzi et al. |
| 11,379,034 B1 | 7/2022 | Wenger et al. |
| 2019/0041979 A1* | 2/2019 | Kirchner ................ B64D 43/00 |

(Continued)

FOREIGN PATENT DOCUMENTS

| | | |
|---|---|---|
| EP | 3827584 A4 | 9/2021 |
| EP | 3884404 A1 | 9/2021 |

(Continued)

*Primary Examiner* — Brent D Castiaux
(74) *Attorney, Agent, or Firm* — Suiter Swantz pc llo (57) ABSTRACT

A system and method for predicting an estimated head pose solution of a head worn display (HWD) at a future time selects or determines, for each HWD rotational axis, a relative angular rate of a head reference frame relative to a body reference frame. By sampling the relative angular rate, a relative angular acceleration is determined. Based on a projection time associated with estimated display latency, angular increment vectors for each rotational axis are determined for relative angular rate and relative angular acceleration. The current head pose solution is adjusted with respect to one or more axes based on the angular increment vectors to project the head pose estimate ahead based on the projection time, the resulting projected head pose solution corresponding to a predicted orientation of the head frame relative to the body frame at the future time.

14 Claims, 5 Drawing Sheets

(56) References Cited

U.S. PATENT DOCUMENTS

2020/0225473 A1\* 7/2020 Selan ................. G02B 27/0093
2022/0146822 A1 5/2022 El-Ghoroury
2022/0260839 A1 8/2022 Wan et al.

FOREIGN PATENT DOCUMENTS

WO 2021152447 A1 8/2021
WO 2022159200 A1 7/2022

\* cited by examiner

SYSTEM AND METHOD FOR POSE PREDICTION IN HEAD WORN DISPLAY (HWD) HEADTRACKERS

BACKGROUND

In order to accurately represent earth-fixed symbology via a head-worn display (HWD) or helmet-mounted display (HMD) worn by an aircraft pilot or operator, the pose (e.g., position and orientation) of the pilot's head relative to the aircraft must be continually estimated in a precise high-integrity fashion. The HWD must account for the pilot's head pose relative to the aircraft and the aircraft's pose relative to an earth-centered earth-fixed (ECEF) reference frame (e.g., which may involve additional intermediate reference frames) so that the positioning of earth-fixed symbology does not render it hazardously misleading information (HMI).

However, a significant challenge to conformal rendering of earth-fixed symbology by the HWD is presented by display system latency. For example, in the presence of sustained head motion on the part of the pilot, uncompensated latency may cause earth-fixed symbology to drift from a conformal alignment.

SUMMARY

In a first aspect, a system for predicting a position and/or orientation (pose) of an HWD relative to a platform or body frame of an aircraft or other mobile platform is disclosed. In embodiments, the system selects a relative angular rate of motion of a head-centered reference frame relative to a body-centered/platform-centered reference frame. The system determines, by sampling the relative angular rate, a relative head-to-body angular acceleration. Based on a projection time associated with estimated system latency within the HWD, the system determines angular increment vectors for the relative angular rate and relative angular acceleration. The system receives a current estimated head pose solution from the HWD headtracker and adjusts the head pose solution with respect to the received angular increment vectors for each rotational axis to project the head pose solution forward by the projection time. The resulting projected head pose solution can predict a rotational orientation of the head frame relative to the body frame at a desired future time to counteract HWD system latency, e.g., when sustained head motion is relatively high.

In some embodiments, the projection time is predetermined, e.g., hard-coded into system firmware or stored to memory.

In some embodiments, the projection time is reduced, e.g., when head motion is at or below a minimum level and the corresponding reduced system latency renders pose prediction a lower priority.

In some embodiments, the system applies filtering to the relative angular acceleration.

In some embodiments, the system determines the projected head pose solution by adjusting the estimated rotational orientation of the head frame relative to the body frame with respect to each rotational axis, based on a total angular increment vector determined for that rotational axis.

In some embodiments, the system receives from a head-mounted IMU (hIMU; e.g., fixed to the helmet or user's head) an angular rate of motion of the head reference frame relative to an inertial frame and receives from a body-mounted/platform-mounted IMU (bIMU, pIMU; e.g., fixed to the aircraft or mobile platform) an angular rate of motion of the body reference frame relative to the inertial frame, and determines the relative angular rate of motion based on the received head-frame and body-frame angular rates.

In some embodiments, the system selects a relative angular rate of motion determined by, and received from, optical flow sensors connected to an optical head tracking system of the HWD.

In a further aspect, a computer-assisted method for predicting a future head pose of an HWD (e.g., relative to a body frame of an aircraft or mobile platform) is also disclosed. In embodiments, the method includes, for each rotational axis of the HWD (e.g., x, y, z), selecting a relative angular rate of motion (e.g., of a head reference frame relative to a body reference frame (e.g., platform reference frame). The method includes determining a relative angular acceleration (e.g., head-frame relative to body-frame) at a current time by sampling the relative angular rate. The method includes adjusting a projection time relative to the current time, the projection time based on an estimated display system latency and determining the future time at which the relative head pose estimate (e.g., the rotational orientation of the head frame relative to the body frame) will be predicted. The method includes (e.g., still for each rotational axis) determining, based on the projection time, angular increment vectors for the relative angular rate and relative angular acceleration. The method includes determining a total angular increment vector for a particular rotational axis by combining the angular increment vectors for the relative angular rate and relative angular acceleration. The method includes receiving from a headtracking system of the HWD a current estimated head pose solution, e.g., a current estimate of the position and orientation of the head frame relative to the body frame. The method includes adjusting the current head pose solution with respect to each rotational axis based on the total angular increment vector determined for that rotational axis, the adjusted head pose solution capable of predicting the head-frame to body-frame rotational orientation at the desired future time.

In some embodiments, the projection time is predetermined based on an a priori system latency estimate and, e.g., hard-coded into system firmware or stored to memory.

In some embodiments, the method includes reducing the projection time if head frame movement meets or deceeds a minimum level.

In some embodiments, the method includes filtering the relative angular acceleration based on a moving average of N samples of the relative angular rate.

In some embodiments, the method includes adjusting the estimated head pose solution by adjusting the estimated rotational orientation of the head frame relative to the body frame with respect to one or more rotational axes of the HWD, based on the determined total angular increment vectors for each rotational axis.

In some embodiments, the method includes selecting a relative angular rate by receiving head-frame angular rate of motion (e.g., relative to an arbitrary inertial frame) from a head-mounted IMU and a body-frame angular rate of motion (e.g., relative to the same inertial frame) from a body-mounted IMU. For example, the method includes determining (e.g., for each rotational axis) the relative angular rate based on the received head-frame and body-frame angular rates.

In some embodiments, the method includes selecting a relative angular rate determined by, and received from, optical flow sensors connected to an optical head tracking system of the HWD.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to systems and methods for compensating for display system latency in a HWD (e.g., a helmet-mounted display (HMD), visor display, or other head-worn display worn to an aircraft pilot or other operator of a mobile platform) by projecting head pose estimates forward in time in order to predict a head pose of the HWD (e.g., an orientation of the head-centered reference frame of the HWD relative to the platform-centered reference frame of the mobile platform) to a future time. By predicting future head poses by projecting current head pose estimates into the future based on angular rate/acceleration measurements and system display latency estimates, lower perceived latency and reduced risk of HMI presentation may be achieved even with lower-cost but higher-latency commercial off the shelf (COTS) display systems. Further, while pose prediction may be maximally effective during periods of sustained high head motion, projection time may be dynamically reduced to minimize jitter when head motion is low and the correspondingly lower system latency makes pose prediction less necessary.

Figure 1:
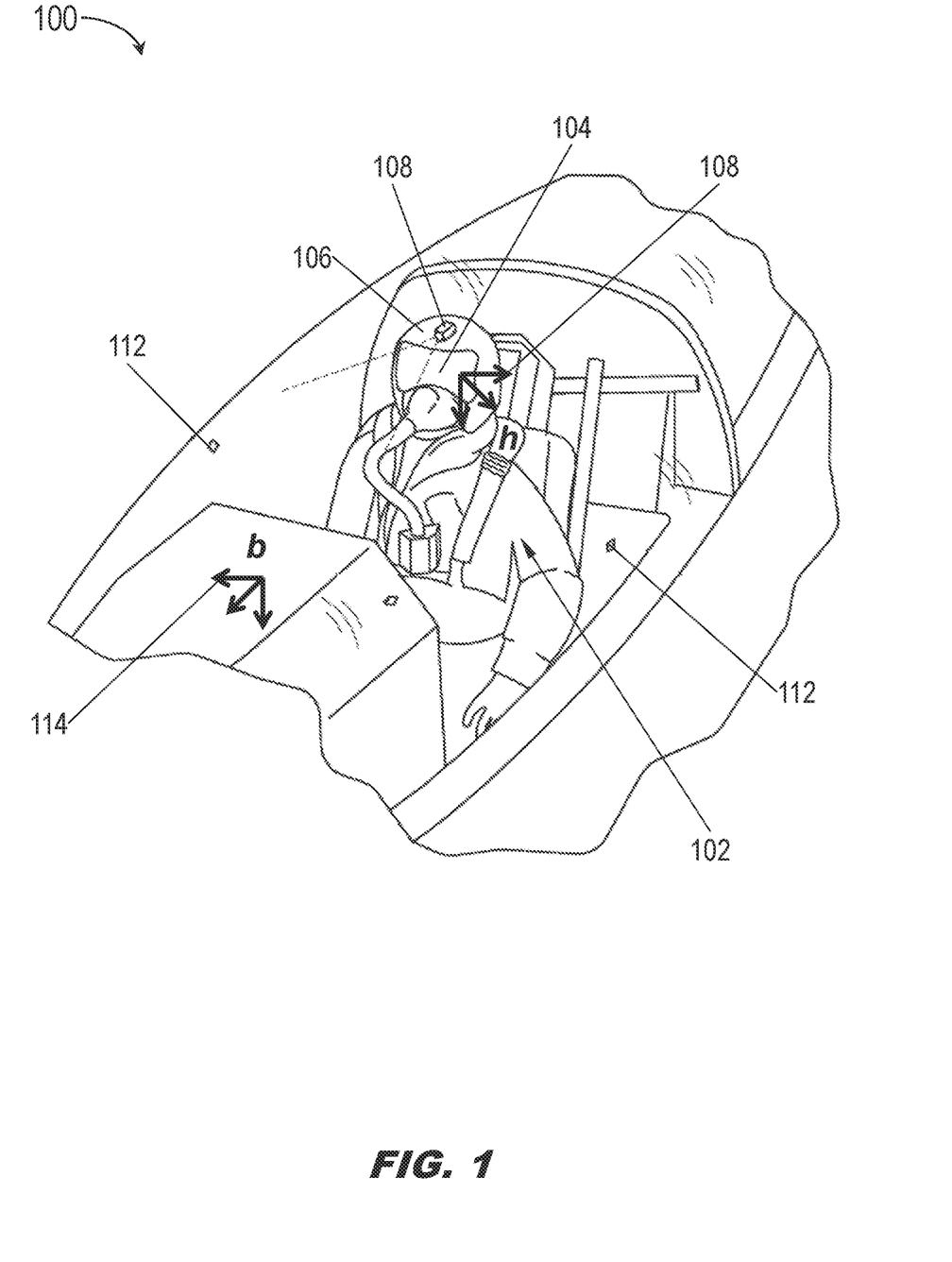
FIG. 1 is an illustration of an aircraft cockpit environment and a head worn display (HWD) worn by a pilot of the aircraft, the HWD including a head tracking system in an inside-out configuration according to example embodiments of this disclosure.

Referring now to FIG. 1, an aircraft 100 is shown.

In embodiments, the aircraft 100 may be controlled by a pilot or other user 102 wearing a head worn display 104 (HWD; e.g., helmet-mounted display (HMD)). For example, the HWD 104 may include a display unit proper, e.g., integrated into a helmet 106 or visor worn by the user 102, and a head tracker system incorporating components fixed or otherwise attached to the helmet and within the cockpit or control area of the aircraft 100.

In embodiments, the head tracker system may include an optical tracker at least partially integrated into the helmet 106. For example, the optical tracker may include one or more cameras 108 or other like image sensors attached to the helmet 106 and configured to capture a continuous stream of image data corresponding to whatever the user 102 is looking at, or seeing, at any particular moment. The camera 108 may be fixed to the helmet 106, e.g., in a strapdown configuration, wherein the camera moves in unison with the helmet, and with the head of the user 102, and is said to be in a head-centered reference frame 110 ("head frame", h). Alternatively, the camera 108 may be attached to the helmet 106 via one or more gimbals (not shown) capable of translating or rotating the camera relative to the helmet. In embodiments, the camera/s 108 may be tuned to operate in a variety of spectral bands, e.g., visible-range, near-infrared (NIR), short wave infrared (SWIR), long wave IR (LWIR).

In embodiments, when the camera 108 is in the strapdown configuration, the position and orientation ("pose") of the camera may be equivalent to the pose of the head of the user 102, or in a fixed relationship (e.g., constant rotation and/or translation) relative to the head pose. For example, when the user 102 moves their head (e.g., translates, rotates), the head tracker includes head-frame inertial measurement units (IMU, hIMU) integrated into the helmet 106 and capable of tracking each translation and rotation of the head in the head frame 110, e.g., relative to a reference pose (for example, when the user's head is oriented straight ahead at eye level).

In embodiments, the head tracker may estimate the head pose of the user 102 by detecting and decoding fiducial markers 112 within the cockpit environment. For example, each fiducial marker 112 may be fixed within the cockpit environment at a position and orientation (e.g., relative to the aircraft 100) known to the head tracker. Further, each fiducial marker 112 may include an encoded identifier (ID) decodable by the head tracker and uniquely distinguishing each fiducial marker, e.g., within a set of such markers disposed throughout the cockpit environment.

In embodiments, by identifying image regions corresponding to each fiducial marker 112 from within image data captured by the camera 108, the head tracker may compare the relative positions and/or orientations of each detected fiducial marker with their known positions and orientations and thereby estimate the position and orientation of the camera (and thus the head of the user 102) at the time the image was captured.

In embodiments, the aircraft 100 may determine its position and orientation in both an absolute and a relative sense. For example, the aircraft 100 may include an absolute positioning system, e.g., one or more global navigation satellite system (GNSS) based receivers configured to receive positioning signals from orbiting navigational satellites (e.g., GPS, GLONASS, Galileo, BeiDou, NavIC, QZSS). Based on the arrival times of signals received from multiple satellites, the GNSS based receivers can determine the aircraft's distance from each satellite at the time of reception and thereby determine an absolute position of the aircraft in an earth-centered, earth-fixed (ECEF) reference frame ("earth frame", e) to a high degree of precision. Similarly, the aircraft 100 may include IMUs capable of determining a relative position and orientation of the aircraft in a platform-centered/body-centered reference frame 114 (e.g., platform frame p, body frame b) relative to a reference pose of the aircraft. For example, if the aircraft 100 enters an airspace where GNSS services are unavailable or unreliable, the body-frame IMUs (bIMU) may track the relative position of the aircraft relative to a last known absolute position as determined by the GNSS receivers, as well as the orientation of the aircraft relative to its roll, pitch, and yaw axes (e.g., x-, y-, and z-axes).

Any IMU, regardless of its reference frame, is subject to some degree of inherent drift and/or internal noise. For example, as noted above a bIMU may track a relative position and orientation of the aircraft 100 in the body frame 114, e.g., relative to its last known absolute position and orientation, but as the elapsed time increases from this last known pose, so too will the level of inherent drift. Aiding devices may provide a means for correcting and compensating for inherent drift in inertial navigation systems. For example, U.S. Pat. No. 10,216,265, which is incorporated by reference herein in its entirety, discloses a numerically stable extended Kalman filter for relative navigation, or estimating a pose of a user's (102; e.g., pilot) head (e.g., as measured by the hIMU in the head frame 110) relative to the pose of an aircraft 100 (e.g., as measured by the bIMU in the body frame 114) carrying the user. Optical (or magnetic) aiding devices may provide estimated head pose measurements ("pose estimates") in six degrees of freedom (6 DoF), e.g., translation along x-, y-, and z-axes (roll, pitch, yaw) and rotation relative to these axes. 6DoF pose estimates provided by the aiding devices may correct for drift and noise in a relative navigational solution estimating the pose of the pilot's head relative to the aircraft in order to display flight guidance cues on the HWD 104 display unit. Further, the relative navigation solution may include an error model estimating the probability of displaying hazardously misleading information (HMI) and bounding the accuracy of the head pose estimate by attempting to estimate and/or account for drift, noise, and other uncertainties within the navigational system. For example, system integrity requirements generally mandate this probability be no more than $1e^{-5}$ to $1e^{-7}$ (.00001 to .001 percent) per hour, or a pose error more than 0.5 to 4 inches in position and 3 to 20 milliradians (mrad) in orientation.

Figure 2:
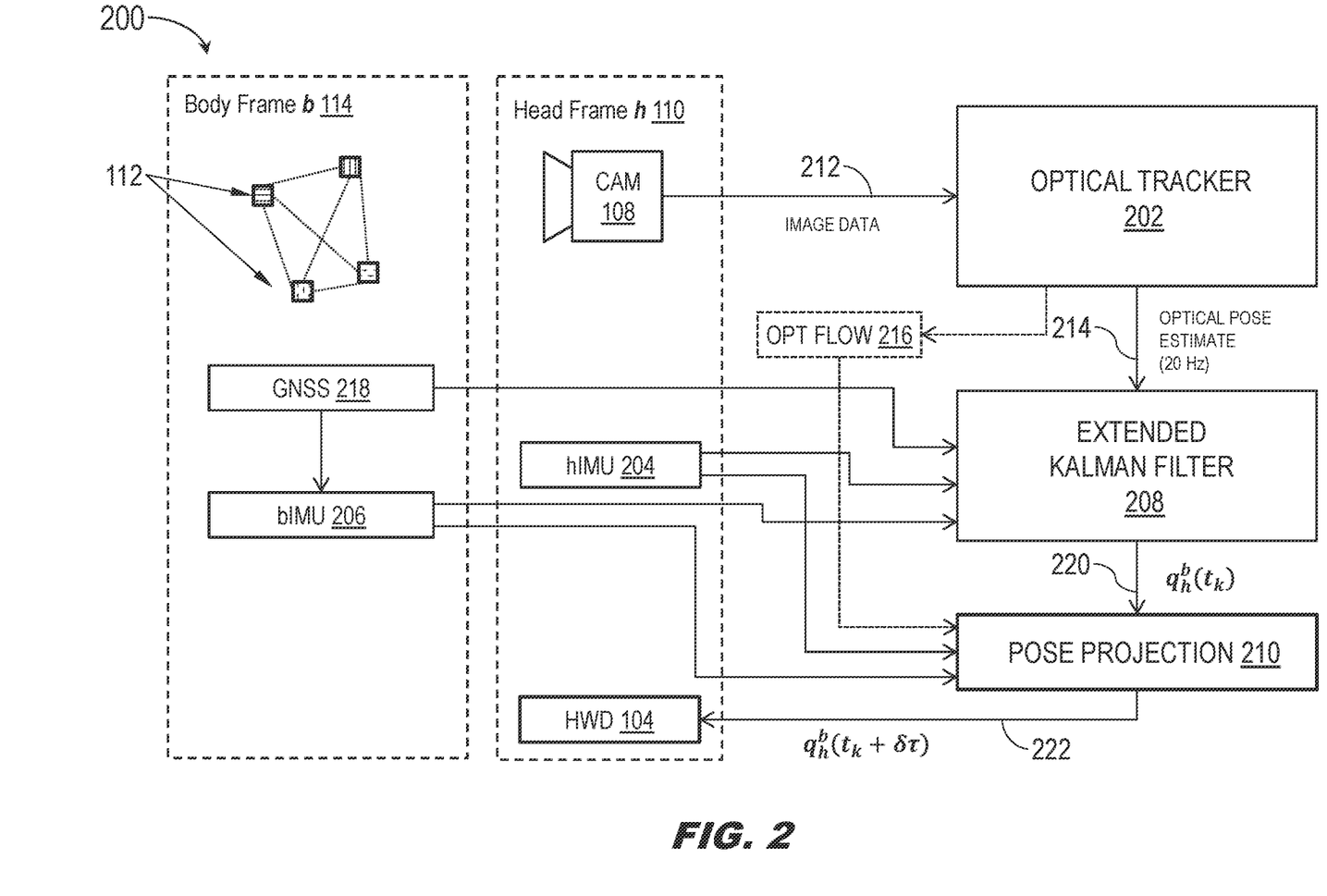
FIG. 2 is a block diagram of the head tracking system incorporating an extended Kalman filter (EKF) of FIG. 1.

Referring now to FIG. 2, a head tracking system 200 ("headtracker") for an HWD 104 is shown. The head tracking system 200 may include, in addition to the camera 108 and fiducial markers 110: optical tracker 202, head-frame IMU 204 (hIMU), body-frame IMU 206 (bIMU; also platform-frame IMU (pIMU)), Kalman filter 208 (e.g., extended Kalman filter (EKF), hybrid EKF), and pose projection module 210.

In embodiments, the head-tracking system 200 may be configured in an inside-out configuration. For example, the camera 108 and hIMU 204 may be attached to a helmet (106, FIG. 1) worn by the user (102, FIG. 1), such that image data 212 captured by the camera 108 and position and orientation (pose) data measured by the hIMU 204 may be in the head frame 110. In embodiments, image data 212 may be analyzed by the optical tracker 202 to identify image regions corresponding to the fiducial markers 112 and, by comparing the relative locations of the image regions to the known location of each fiducial marker, estimate the optical pose of the camera with respect to the three-dimensional (3D) constellation reference frame in which the known locations and orientations of each fiducial marker are defined (e.g., the body frame, when the locations and orientations of each fiducial marker in an inside-out configuration are fixed with respect to the aircraft (100, FIG. 1)). For example, the optical tracker 202 may determine an initial (e.g., coarse) pose estimate based on an initial match of image regions associated with detected fiducial markers 112 with the 3D position and orientation data for each marker. In embodiments, the optical tracker 202 may refine the initial pose estimate using a variety of techniques and/or algorithms, resulting in a refined (e.g., fine) head pose estimate 214. For example, the refined head pose estimate 214 may include an error model (e.g., an $H_1$ protection level, or the probability of a single hypothetical fault with respect to a pose measurement, and/or pose covariance).

In embodiments, the hIMU 204 may provide high-rate pose data (relative to the head frame 110) to the hybrid EKF 208. For example, at no less than a minimum rate (e.g., 200 Hz) the hIMU 204 may provide a measured 3D angular rate of motion and 3D translational acceleration in the head frame 110 (e.g., in addition to a precise timestamp for each measurement).

In embodiments, the bIMU 206 and fiducial markers 112 may be oriented (e.g., in an inside-out configuration) in the platform-centered reference frame 114 (e.g., platform frame, body frame). For example, the fiducial markers 112 may each be fixed in a position and orientation relative to the body frame 114 (e.g., a 3D constellation frame). In embodiments, the bIMU 206 may provide high-rate pose data (relative to the body frame 114) at a minimum rate similar to the hIMU 204 (e.g., measured 3D angular rate, measured 3D translational acceleration, timestamp at 200 Hz minimum).

In embodiments, the bIMU 206 may additionally provide low-rate high-integrity pose data. For example, the bIMU 206 may include a georeferenced (e.g., World Geodetic System 1984 (WGS84) or any appropriate ECEF) attitude and heading reference system (AHRS) in communication with a GNSS-driven absolute position receiver 218 (e.g., GPS.IRS). In embodiments, at a lower rate (e.g., 20 Hz) than the high-rate pose data produced by the hIMU 204 and bIMU 206, the bIMU may provide timestamped low-rate 3D georeferenced position data (e.g., in a north-east-down navigational reference frame n; lat/long/alt in WGS84 coordinates; X, Y, Z in a like ECEF coordinate frame) and georeferenced 3D orientation data (e.g., pitch, roll, heading). In embodiments, the low-rate high integrity georeferenced pose data and corresponding low-rate head pose estimates 214 provided by the optical tracker 202 may be the basis of a low-rate high integrity head pose solution sufficiently accurate for presentation to and use by high integrity applications running on the HWD 104. For example, the low-rate high integrity solution may be updated by the hybrid EKF 208 based on the high-rate head-frame and platform-frame pose data provided by the hIMU 204 and bIMU 206, resulting in an updated hybrid head-to-body (h2b; also head-to-platform (h2p)) direction cosine matrix (DCM) 220 output by the hybrid EKF, corresponding to a quaternion $q_h^b$ ($t_k$) expressing a rotation of the head frame 110 relative to the body frame 114 at a current time $t_k$.

In some embodiments, the head tracking system 200 is a magnetic (rather than optical) head tracking system wherein the cameras 108, fiducial markers 112, and optical tracker 202 are replaced by a magnetometer capable of detecting a well-known magnetic field source, which detection provides an alternative basis to the optical tracker for determining a transformation between Oh and Oa reference frames. For example, such a magnetic-field based head tracking system is referenced and described by the related patent application having Ser. No. 17/953,227, which application is incorporated by reference herein in its entirety.

In embodiments, the pose projection module 210 may comprise encoded instructions executable by processors of the head tracker system 200 (e.g., similarly to the optical tracker 202 and hybrid extended Kalman filter 208). For example, the pose projection module 210 may receive, for the current time $t_k$, an updated pose solution 220 (e.g., the hybrid h2b quaternion) from the hybrid EKF 208, angular rate measurements from the hIMU 204 and bIMU 206, and a projection time δτ corresponding to a display latency estimate. The output 222 of the pose projection module 210 may be an updated h2b DCM corresponding to a quaternion $q_h^b$ ($t_k$+δτ) expressing the rotation of the head frame 110 relative to the body frame 114 projected forward to the subsequent time $t_k$+δτ to predict an orientation of the HWD 104 relative to the aircraft/mobile platform 100 at the subsequent time.

In some embodiments, the head tracking system 200 may include optical flow sensors 216. For example, optical flow sensors 216 may analyze the image data 212 on a frame-by-frame basis and estimate, based on changes to the image data between frames and the output rate of the optical tracker 202, a 3D relative angular rate of motion of the head frame relative to the body frame. Accordingly, the pose prediction module 210 may, additionally or alternatively, determine relative angular rate based on head-frame and body-frame angular rates received from, e.g., the hIMU 204 and bIMU 206, or receive relative angular rate measurements as determined by the optical flow sensors 216.

Figure 3:
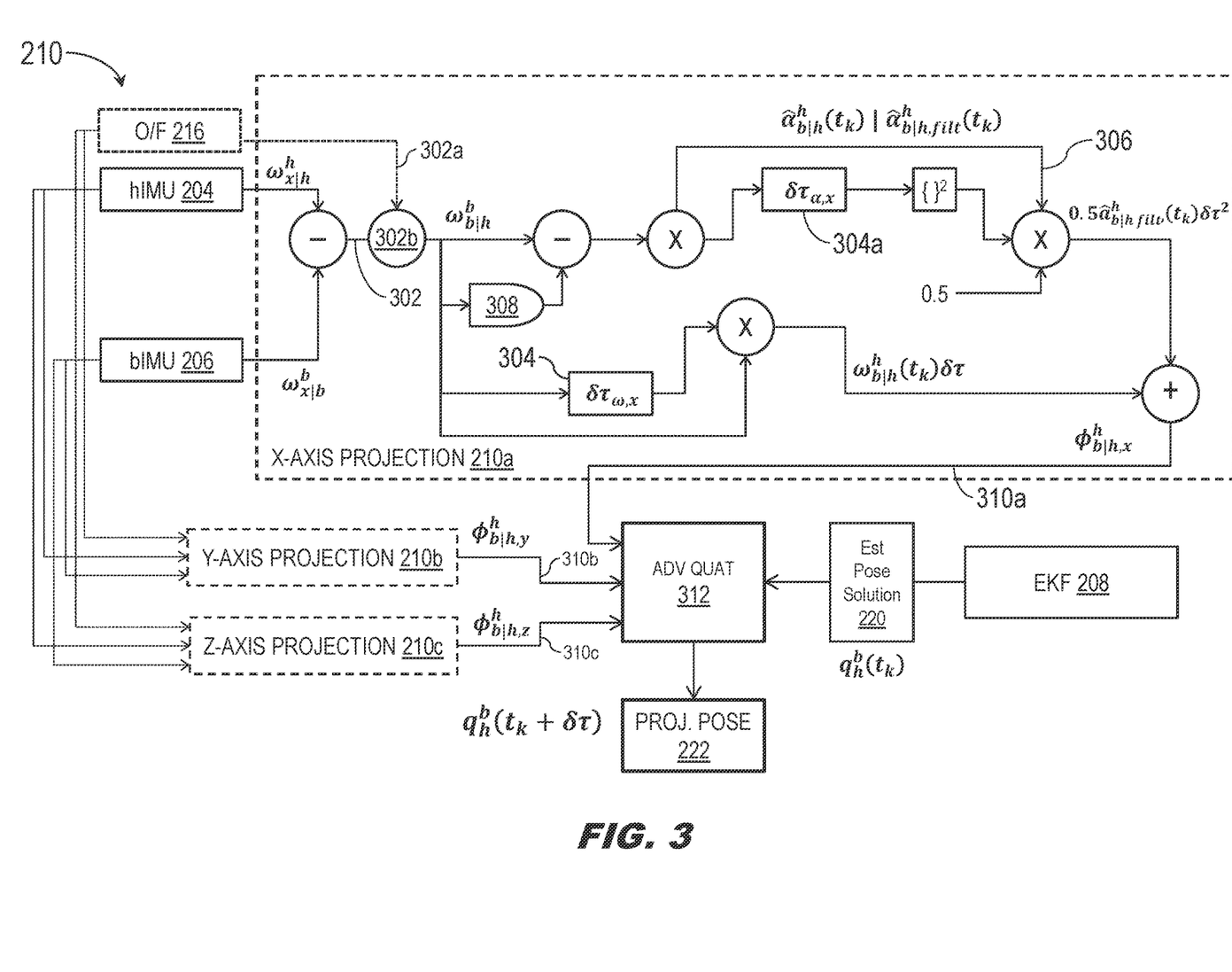
FIG. 3 is an operational flow diagram of a pose projection module of the head tracking system of FIG. 1.

Referring to FIG. 3, the pose projection module 210 is shown.

In embodiments, the pose projection module 210 may include sub-modules 210a, 210b, 210c . . . 210n dedicated to individual rotational axes. For example, with respect to an HWD (104, FIG. 1) and headtracker (200, FIG. 2) wherein the estimated head pose (214, FIG. 2) is in six degrees of freedom (6 DoF), the pose projection module may include three sub-modules 210a, 210b, 210c dedicated to projecting forward an orientation of the head frame (110, FIG. 1) relative to the body frame (114, FIG. 1) with respect to, respectively, a roll axis or x-axis (210a), a pitch axis or y-axis (210b), and a yaw axis or z-axis (210c).

In embodiments, the x-axis pose projection module 210a (e.g., along with the corresponding y-axis and z-axis modules 210b, 210c) may receive (for current time $t_k$) x-axis angular rate measurements (e.g., angular rate $\omega_{ilh}^{h}$ of the head frame 110 with respect to an arbitrary inertial frame in head-frame coordinates, angular rate $\omega_{ilb}^{b}$ of the body frame 114 relative to the inertial frame in body-frame coordinates) from the hIMU 204 and bIMU 206 respectively. Alternatively, as noted above, the pose projection module 210a may receive a relative angular rate 302a determined by the optical flow sensors 216. In some embodiments, e.g., if the head tracking system 200 includes both hIMU 204/bIMU 206 and optical flow sensors 216, each pose projection module 210a-210c may include a selector 302b for selecting a relative angular rate from the relative angular rate 302 as determined by the pose projection module 210a-210c based on the received head-frame and body-frame angular rates $\omega_{ilh}^{h}$, $\omega_{ilb}^{b}$ received from the hIMU/bIMU (as described below) and the relative angular rate determined by the optical flow sensors.

In embodiments, the pose projection module 210a¹ may determine a current relative angular rate 302 ($\omega_{b|h}^{h}$) based on the received angular rate measurements (e.g., and a current body-to-head direction cosine matrix $C_b^h$):

$$\omega_{b|h}^{h} = \omega_{i|h}^{h} - C_b^h \omega_{i|b}^{b} \qquad [1]$$

In embodiments, based on the determined relative angular rate 302, each pose projection module 210a may be associated with a projection time δτ corresponding to a nominal estimate of display system latency and to a future prediction time (e.g., in seconds) relative to the current time $t_k$ and at which the current estimated head pose solution 220 may be predicted. For example, based on the projection time δτ, a projection time 304 ($\delta\tau_{\omega,i}$) may be determined for use with the relative angular rate 302, and a projection time 304a ($\delta\tau_{\alpha,i}$) may be determined for use with the relative angular acceleration 306 (as shown below by equations 11 and 12). For example, the projection time δτ may be predetermined by the head tracking system (200, FIG. 2), e.g., retrieved from memory or hard-coded into system firmware based on an estimated nominal latency within the HWD 104, and the projection times 304, 304a may use the projection time δτ for the projection times $\delta\tau_{\omega,i}$, $\delta\tau_{\alpha,i}$). In some embodiments, the projection time 304, 304a determined at a current time $t_k$ may be dynamically adjusted, e.g., relative to a prior time $t_{k-1}$ at which the head pose solution 220 was calculated and/or updated. For example, when head motion is relatively low, e.g., meets or deceeds a threshold minimum level, the head tracking system 200 may reduce the projection time 304, 304a to minimize jitter as disclosed below.

[1] With respect to the following paragraphs, each reference to operations of the x-axis pose projection module 210a may likewise apply to the pose projection modules 210b, 210c with respect to the y- and z-axes.

In embodiments, the pose projection module 210a may determine a relative angular acceleration $\hat{\alpha}_{b|h}^{h}(t_k)$ (306) by sampling the relative angular rate 302 at a predetermined sampling rate, e.g., according to a sampling period or single-sample delay 308 (e.g., a delay of $dt_{imu}$ seconds, based on an IMU sampling rate or, when the relative angular rate 302 is determined by the optical flow sensors 216, a delay of $dt_{opt}$ seconds based on an optical tracker output rate). By way of a non-limiting example:

$$\hat{\alpha}_{b|h}^{h}(t_k) \equiv \left[\omega_{b|h}^{h}(t_k) - \omega_{b|h}^{h}(t_{k-1})\right]\frac{1}{dt_{imu}} \quad [2]$$

Or, alternatively:

$$\hat{\alpha}_{b|h}^{h}(t_k) \equiv \left[\omega_{i|h}^{h}(t_k) - \omega_{i|h}^{h}(t_{k-1})\right]\frac{1}{dt_{imu}} + \quad [3]$$

$$\left(\omega_{h|b}^{h} \times\right)C_{b}^{h}\omega_{i|b}^{b} - C_{b}^{h}\left[\omega_{i|b}^{b}(t_k) - \omega_{i|b}^{b}(t_{k-1})\right]\frac{1}{dt_{imu}}$$

In some embodiments, the head tracking system 200 may apply filtering (e.g., finite impulse response (FIR) filter, moving average filter with configurable buffer length) to the relative angular acceleration 306. For example:

$$\hat{\alpha}_{b|h,filt}^{h}(t_k) = \text{FIR filter}[\hat{\alpha}_{b|h,filt}^{h}(t_k)] \quad [4]$$

In embodiments, the pose projection module 210a may calculate a total angular increment vector $\phi_{b|h,x}^{h}$ (310a) with respect to the x-axis, e.g., by combining angular increment vectors based on the relative angular rate 302 and relative angular acceleration 306. For example:

$$\phi_{b|h}^{h} = \omega_{b|h}^{h}(t_k)\delta\tau + 0.5\hat{\alpha}_{b|h,filt}^{h}(t_k)\delta\tau^2 \quad [5]$$

In embodiments, the pose projection module 210a may receive the updated pose solution 220 for the current time $t_k$, (e.g., the h2b quaternion $q_h^{b}(t_k)$) from the hybrid EKF 208.

Based on the determined total angular increment vector $\phi_{b|h,x}^{h}$ (310a) for the x-axis, as well as the respective total increment vectors $\phi_{b|h,y}^{h}$, $\phi_{b|h,z}^{h}$ (310b, 310c) for the y-axis and z-axis respectively received from the pose projection modules 210b, 210c, the pose projection module 210 may advance (312) the updated pose solution 220 (e.g., the h2b quaternion $q_h^{b}(t_k)$) along one or more of the x-, y-, and z-axes. Accordingly, the resulting output of the pose projection module 210 may be an updated or projected h2b estimated pose solution 222 corresponding to a projected quaternion $q_h^{b}(t_k+\delta\tau)$ expressing a predicted rotational orientation of the head frame 110 relative to the body frame 114 at the subsequent time $t_k+\delta\tau$. For example, the projected h2b quaternion $q_h^{b}(t_k+\delta\tau)$ may be expressed (e.g., per equation 8) and normalized (e.g., per equation 9) as:

$$s = \frac{1}{2}\|\phi_{b|h}^{h}\| \quad [6]$$

$$\phi_{b|h}^{h} = \begin{bmatrix} 0 & \phi_1^h & \phi_2^h & \phi_3^h \\ -\phi_1^h & 0 & -\phi_3^h & \phi_2^h \\ -\phi_2^h & \phi_3^h & 0 & -\phi_1^h \\ -\phi_3^h & -\phi_2^h & \phi_1^h & 0 \end{bmatrix} \quad [7]$$

$$q_h^{b}(t_k + \delta\tau) = \left(I_4\cos s - \phi_4^x\left(\frac{\sin s}{2s}\right)\right)q_h^{b}(t_k) \quad [8]$$

$$\left[q_h^{b}(t_k + \delta\tau)\right]_{norm} = q_h^{b} * \{1 - 0.5(\|q_h^{b}\|^2 - 1)\} \quad [9]$$

In some embodiments, as noted above, the projection time 304, 304a may be reduced when head motion is low to reduce high frequency errors in the projected pose solution 222. For example, based on the magnitudes of the relative angular rate 302, 302a and/or relative angular acceleration 306, the projection time 304, 304a may be adjusted on an axis-by-axis basis (e.g., reduced for one or more axes, on the basis that relatively low head motion reduces the effect of latency on the conformality of symbology rendered by the HWD 104, and likewise reduces the need for pose prediction).

In embodiments, given an initial projection time $\delta\tau$ the angular increment vector equation 5 above may be modified slightly, resulting in equation 10 below. For example, equation 10 shows a scalar angular increment component $\phi_{b|h,i}^{h}$ for axis i (where i=x, y, or z) as a function of scalar angular rate component $\omega_{b|h,i}^{h}$ for axis i, a corresponding projection time $\delta\tau_{\omega,i}$ (304) for use with the relative angular rate 302, a scalar angular acceleration component $\hat{\alpha}_{b|h,filt,i}^{h}$ about axis i, and a corresponding projection time $\delta\tau_{\alpha,i}$ (304a) for use with the relative angular acceleration 306:

$$\phi_{b|h,i}^{h} = \omega_{b|h,i}^{h}(t_k)\delta\tau_{\omega,i} + 0.5\hat{\alpha}_{b|h,filt,i}^{h}(t_k)\delta\tau_{\alpha,i}^{2} \quad [10]$$

In embodiments, the projection time $\delta\tau_{\omega,i}$ (304) may be calculated:

$$\delta\tau_{\omega,i} = \begin{cases} \frac{|\omega_{b|h,i}^{h}|\delta\tau}{\text{MIN\_RATE\_MAX\_PREDICT}} & |\omega_{b|h,i}^{h}| < \text{MIN\_RATE\_MAX\_PREDICT} \\ \delta\tau & |\omega_{b|h,i}^{h}| \geq \text{MIN\_RATE\_MAX\_PREDICT} \end{cases} \quad [11]$$

and the projection time $\delta\tau_{\alpha,i}$ (304a) may be calculated:

$$\delta\tau_{\alpha,i} = \begin{cases} \frac{|\hat{\alpha}_{b|h,filt,i}^{h}|\delta\tau}{\text{MIN\_ACC\_MAX\_PREDICT}} & |\hat{\alpha}_{b|h,filt,i}^{h}| < \text{MIN\_ACC\_MAX\_PREDICT} \\ \delta\tau & |\hat{\alpha}_{b|h,filt,i}^{h}| \geq \text{MIN\_ACC\_MAX\_PREDICT} \end{cases} \quad [12]$$

Figure 4A:
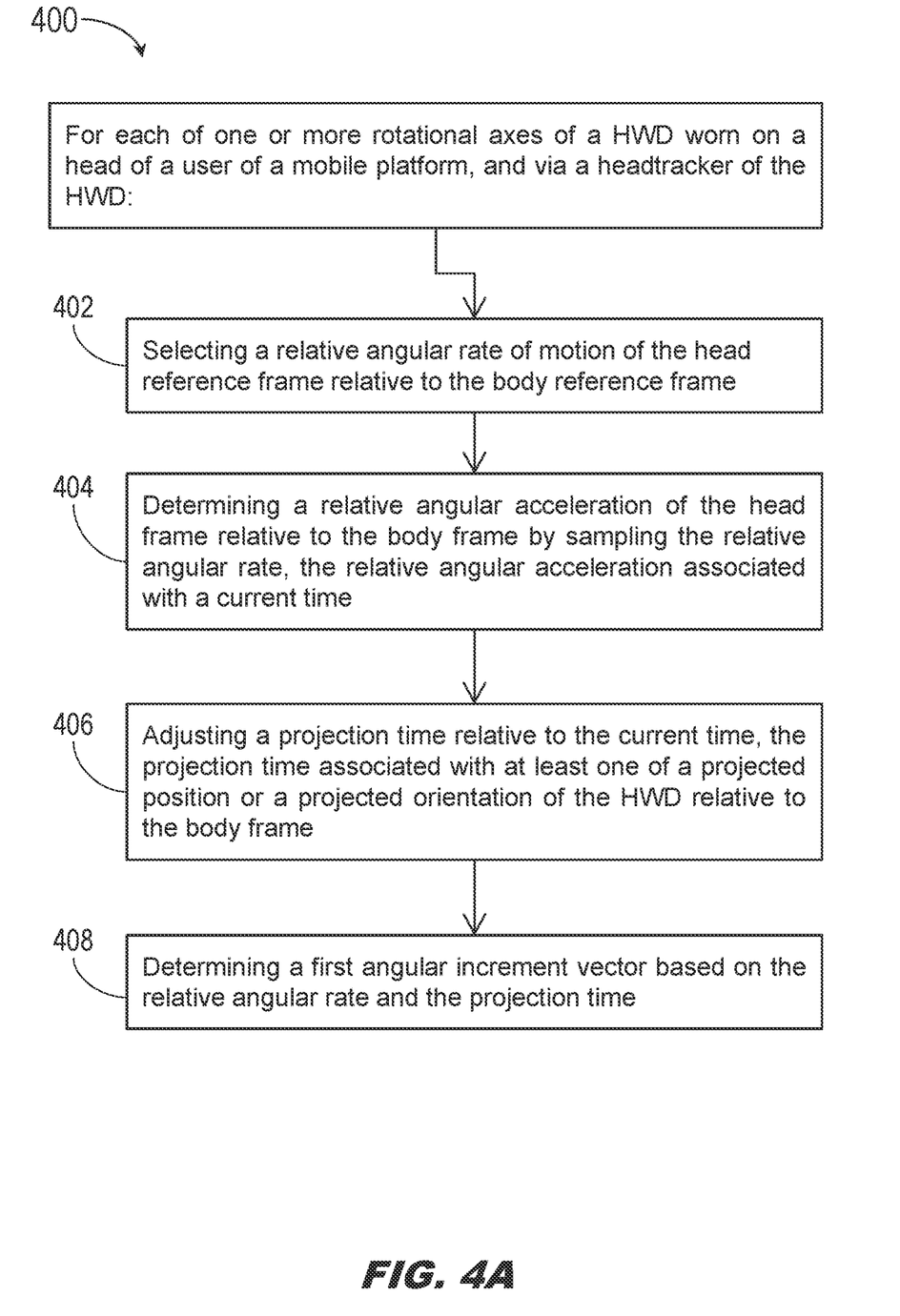
FIGS. 4A and 4B are flow diagrams illustrating a method for predicting a position or orientation (pose) of an HWD relative to a platform/body reference frame at a future time according to example embodiments of this disclosure.

Referring now to FIG. 4A, the method 400 may be implemented by the pose projection module 210 and may include the following steps.

At a step 402, for each rotational axis of a set of rotational axes with which the head tracking system of the HWD determines a pose (e.g., x-, y-, and z-axes; roll, pitch, and yaw axes), the pose projection module selects a relative angular rate of motion of the head frame relative to the body frame. In some embodiments, the pose projection module determines the relative angular rate based on a head-frame angular rate received from a head-mounted IMU (hIMU)

and a body-frame angular rate received from a platform-mounted/body-mounted IMU (bIMU). In some embodiments, the relative angular rate is determined, and received from, optical flow sensors connected to an optical head-tracking system of the HWD. In some embodiments, if both options are available the pose projection module may select one or the other as a relative angular rate for use in pose projection.

At a step 404, the pose projection module determines a relative angular acceleration of the head frame relative to the body frame, and relative to a current time of validity, by sampling the relative angular rate.

At a step 406, the pose projection module adjusts a projection time defining how far into the future (e.g., ahead of the current time of validity) the pose of the HWD will be projected. For example, the projection times for use with the relative angular rate and the relative angular acceleration may be predetermined and hardcoded into firmware and/or stored to memory. In some embodiments, if sustained head motion is low enough (e.g., at or less than a threshold minimum amount), the projection time may be reduced to reduce high frequency errors when headtracker motion is low and pose prediction is a lower priority.

At a step 408, the pose projection module determines a first angular increment vector based on the determined relative angular rate and associated projection time.

Figure 4B:
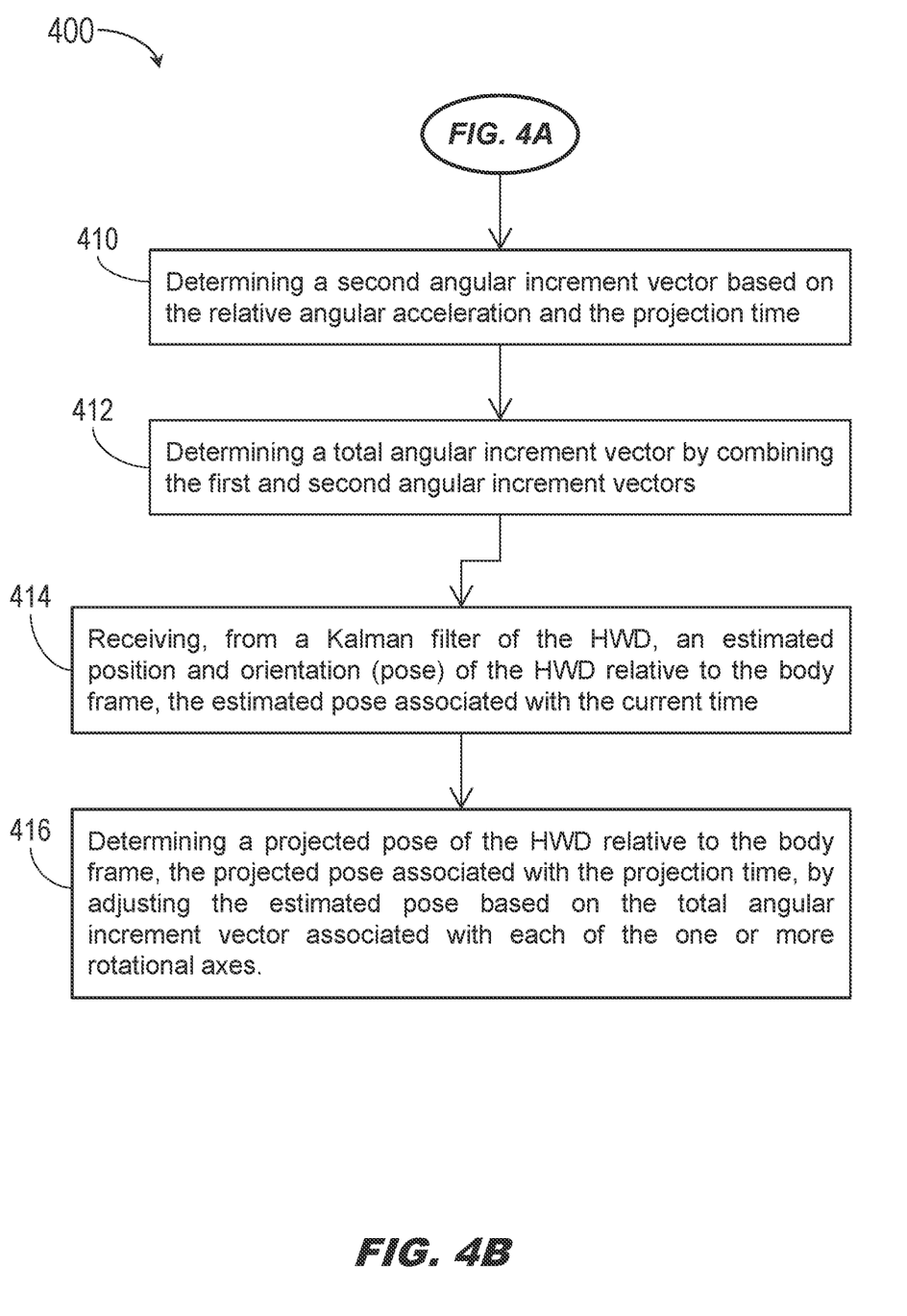

Referring also to FIG. 4B, at a step 410, the pose projection module determines a second angular increment vector based on the determined relative angular acceleration and associated projection time. For example, the relative angular acceleration may be based on a set of N samples of the relative angular rate (e.g., at a predetermined sampling rate, and wherein N is an integer greater than one). Accordingly, the relative angular acceleration may be filtered (e.g., based on a moving average of the set of N samples or any appropriate like finite impulse response (FIR) filter).

At a step 412, the pose projection module determines a total angular increment vector associated with the rotational axis by combining the first and second angular increment vectors associated with the relative angular rate and the relative angular acceleration. For example, each rotational axis will have an associated total angular increment vector.

At a step 414, the pose projection module receives a pose estimate, e.g., an estimated position and/or orientation of the HWD relative to the body frame as determined by a Kalman filter of the head tracking system and corresponding to the current time of validity.

At a step 416, the pose projection module determines a projected pose of the HWD relative to the body frame, projecting the current pose estimate received from the head tracking system forward to the projected time, by adjusting the current pose estimate based on the total angular increment vector determined for each rotational axis. For example, the pose projection module may project the current pose estimate forward in time by adjusting the estimated orientation of the HWD relative to one or more rotational axes, depending on each axis-specific total angular increment vector.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A system for predicting at least one of a position or an orientation of a head worn display (HWD), the system comprising:
    at least one processor operatively coupled to an HWD worn on a head of a user of a mobile platform, the at least one processor configurable by processor-executable instructions to:
        for each of one or more rotational axes of the HWD:
            determine, based on one or more of 1) a head-frame angular rate of motion of a head reference frame relative to an inertial frame and 2) a body-frame angular rate of motion of a body reference frame relative to the inertial frame, a relative angular rate of motion of the head reference frame relative to the body reference frame;
            determine, by sampling the relative angular rate, a relative angular acceleration of the head reference frame relative to the body reference frame, the relative angular acceleration associated with a current time;
            adjust a projection time relative to the current time, the projected time associated with at least one of a projected position or a projected orientation of the HWD relative to the body reference frame;
            determine a first angular increment vector based on the relative angular rate and the projection time;
            determine a second angular increment vector based on the relative angular acceleration and the projection time; and
            determine a total angular increment vector by combining the first and second angular increment vectors;
            receive, from a Kalman filter of the HWD, an estimated pose of the HWD relative to the body reference frame, the estimated pose associated with the current time; and
            determine a projected pose of the HWD relative to the body reference frame, the projected pose associated with the projection time, by adjusting the estimated pose based on the total angular increment vector associated with each of the one or more rotational axes.

2. The system of claim 1, wherein the at least one processor is configured to adjust the projection time by setting the projection time to a predetermined projection time.

3. The system of claim 1, wherein the at least one processor is configured to adjust the projection time by reducing the projection time when at least one of the relative angular rate or the relative angular acceleration meets or deceeds a minimum level.

4. The system of claim 1, wherein:
the at least one processor is configured to determine the relative angular acceleration based on N samples of the relative angular rate, wherein N is an integer greater than one; and
wherein determining the second angular increment vector based on the relative angular acceleration includes filtering the relative angular acceleration based on a moving average of the N samples.

5. The system of claim 1, wherein the at least one processor is configured to determine the projected pose of the HWD by adjusting at least one estimated orientation of the estimated pose, the estimated orientation associated with a first rotational axis of the one or more rotational axes, based on the total angular increment vector associated with the first rotational axis.

6. The system of claim 1, wherein the at least one processor is configured to:
receive, from an inertial measurement unit (IMU) of the HWD, a head-frame angular rate of motion of a head reference frame relative to an inertial reference frame;
receive, from a body-mounted IMU (bIMU) fixed to the mobile platform, a body-frame angular rate of motion of a body reference frame relative to the inertial reference frame; and
determine the relative angular rate of motion based on the received head-frame angular rate of motion and the received body-frame angular rate of motion.

7. The system of claim 1, wherein the at least one processor is configured to receive the relative angular rate of motion from one or more optical flow sensors operatively coupled to the HWD.

8. A computer-assisted method for projecting a position and orientation (pose) of a head worn display (HWD), the method comprising:
for each of one or more rotational axes of a HWD worn on a head of a user of a mobile platform, and via a headtracker of the HWD:
selecting a relative angular rate of motion of a head reference frame relative to a body reference frame;
determining a relative angular acceleration of the head reference frame relative to the body reference frame by sampling the relative angular rate, the relative angular acceleration associated with a current time;
adjusting a projection time relative to the current time, the projection time associated with at least one of a projected position or a projected orientation of the HWD relative to the body reference frame;
determining a first angular increment vector based on the relative angular rate and the projection time;
determining a second angular increment vector based on the relative angular acceleration and the projection time; and
determining a total angular increment vector by combining the first and second angular increment vectors;

receiving, from a Kalman filter of the HWD, an estimated position and orientation (pose) of the HWD relative to the body reference frame, the estimated pose associated with the current time; and
determining a projected pose of the HWD relative to the body reference frame, the projected pose associated with the projection time, by adjusting the estimated pose based on the total angular increment vector associated with each of the one or more rotational axes.

9. The method of claim 8, wherein the projection time is a predetermined projection time.

10. The method of claim 8, wherein adjusting a projection time relative to the current time includes:
reducing the projection time when at least one of the relative angular rate or the relative angular acceleration meets or deceeds a minimum level.

11. The method of claim 8, wherein:
determining a relative angular acceleration of the body reference frame relative to the head reference frame by sampling the relative angular rate includes determining a relative angular acceleration based on N samples of the relative angular rate, wherein N is an integer greater than one; and
wherein determining a second angular increment vector based on the relative angular acceleration includes filtering the relative angular acceleration based on a moving average of the N samples.

12. The method of claim 8, wherein determining a projected pose of the HWD relative to the body reference frame, the projected pose associated with the projection time, by adjusting the estimated pose based on the total angular increment vector associated with each rotational axis, includes:
determining a projected orientation of the HWD relative to the body reference frame by adjusting at least one estimated orientation of the estimated pose, the estimated orientation associated with a first rotational axis of the one or more rotational axes, based on the total angular increment vector associated with the first rotational axis.

13. The method of claim 8, wherein selecting a relative angular rate of motion of a head reference frame relative to a body reference frame includes:
receiving a head-frame angular rate of motion of the head reference frame relative to an inertial frame from a head-mounted inertial measurement unit (IMU, hIMU) of the HWD;
receiving a body-frame angular rate of motion of the body reference frame relative to the inertial frame from a body-mounted IMU (bIMU) fixed to the mobile platform; and
determining the relative angular rate of motion based on the received head-frame angular rate of motion and the received body-frame angular rate of motion.

14. The method of claim 8, wherein selecting a relative angular rate of motion of a head reference frame relative to a body reference frame includes:
receiving the relative angular rate of motion via at least one optical flow sensor of the HWD.

* * * * *